United States Patent
Janni et al.

(10) Patent No.: US 8,965,060 B2
(45) Date of Patent: Feb. 24, 2015

(54) AUTOMATIC DETECTION OF OBJECT PIXELS FOR HYPERSPECTRAL ANALYSIS

(71) Applicant: Pioneer Hi-Bred International, Inc., Johnston, IA (US)

(72) Inventors: James Janni, Johnston, IA (US); Steven L. Wright

(73) Assignee: Pioneer Hi-Bred International, Inc., Johnston, IA (US)

( * ) Notice: Subject to any disclaimer, the term of this patent is extended or adjusted under 35 U.S.C. 154(b) by 95 days.

(21) Appl. No.: 13/647,628

(22) Filed: Oct. 9, 2012

(65) Prior Publication Data

US 2013/0094717 A1   Apr. 18, 2013

Related U.S. Application Data

(60) Provisional application No. 61/546,677, filed on Oct. 13, 2011.

(51) Int. Cl.
G06K 9/00  (2006.01)
G06K 9/20  (2006.01)

(52) U.S. Cl.
CPC .......... *G06K 9/2018* (2013.01); *G06K 2209/17* (2013.01)
USPC ....................................................... 382/110

(58) Field of Classification Search
None
See application file for complete search history.

(56) References Cited

U.S. PATENT DOCUMENTS

| | | | |
|---|---|---|---|
| 2004/0024298 A1* | 2/2004 | Marshik-Geurts et al. | ... 600/326 |
| 2004/0146615 A1* | 7/2004 | McDonald et al. | ........... 426/231 |
| 2008/0199080 A1* | 8/2008 | Subbiah et al. | ............... 382/190 |
| 2011/0125477 A1* | 5/2011 | Lightner et al. | ................. 703/11 |
| 2011/0261351 A1* | 10/2011 | Treado et al. | ................... 356/73 |
| 2012/0133775 A1* | 5/2012 | Treado et al. | ................. 348/164 |
| 2012/0229796 A1* | 9/2012 | Priore | .............................. 356/51 |

OTHER PUBLICATIONS

Chevallier, S., et al., "Application of PLS-DA in multivariate image analysis," *Journal of Chemometrics*, 2006, vol. 20(5), pp. 221-229.
Panneton, B., et al., "Improved Discrimination Between Monocotyledonous and Dicotyledonous Plants for Weed Control Based on the Blue-Green Region of Ultraviolet-Induced Fluorescence Spectra," *Applied Spectroscopy*, 2010, vol. 64(1), pp. 30-36.

* cited by examiner

*Primary Examiner* — Shervin Nakhjavan
(74) *Attorney, Agent, or Firm* — Ballard Spahr LLP

(57) ABSTRACT

A method is provided for automatically discerning between object and non-object pixels in a hyperspectral image data cube. In particular embodiments, the object of the method is a plant, plant part, plant trait, plant phenotype, plant pot or a plant medium. The method comprises a first step of providing a partial least squares discriminant analysis (PLSDA) algorithm and a second step of applying the PLSDA algorithm to a hyperspectral image data cube to automatically determine which pixels contain the spectral properties of the object. The PLSDA algorithm of the method can be generated by establishing a training matrix, performing an eigenvector decomposition of the training matrix, experimentally determining a weighted linear combination of object signal-containing eigenvectors, calculating a regression vector using the weighted linear combination of signal-containing eigenvectors, generating a mask matrix and multiplying the mask matrix by the hyperspectral image data cube along two spatial dimensions.

20 Claims, 4 Drawing Sheets

AUTOMATIC DETECTION OF OBJECT PIXELS FOR HYPERSPECTRAL ANALYSIS

CROSS-REFERENCE TO RELATED APPLICATIONS

This Application claims the benefit of U.S. Provisional Application No. 61/546,677, filed Oct. 13, 2011, the content of which is herein incorporated by reference in its entirety.

FIELD OF THE INVENTION

The invention relates to the field of plant breeding. Specifically, the invention provides methods for analyzing plants by hyperspectral image analysis.

BACKGROUND

The agricultural industry continuously develops new plant varieties which are designed to produce high yields under a variety of environmental and adverse conditions. At the same time, the industry also seeks to decrease the costs and potential risks associated with traditional approaches such as fertilizers, herbicides and pesticides. In order to meet these demands, plant breeding techniques have been developed and used to produce plants with desirable phenotypes. Such phenotypes may include, for example, increased crop quality and yield, increased crop tolerance to environmental conditions (e.g., drought, extreme temperatures), increased crop tolerance to viruses, fungi, bacteria, and pests, increased crop tolerance to herbicides, and altering the composition of the resulting crop (e.g., sugar, starch, protein, or oil).

To breed plants that exhibit a desirable trait or phenotype, a wide variety of techniques can be employed (e.g., crossbreeding, hybridization, recombinant DNA technology). Many methods have been developed to screen new plant varieties for the appearance of advantageous traits and phenotypes, including hyperspectral image analysis. In this method, a hyperspectral image of a plant is captured and the pixels of each image are analyzed for their spectral properties across a range of wavelengths.

An advantage to hyperspectral image analysis is that, because an entire spectrum is acquired at each pixel in a hyperspectral image data cube, known relationships between spectral signatures and plant health can be assessed over a full plant. However, disadvantages of hyperspectral image analysis include both cost and complexity. Due to the fact that hyperspectral image data cubes are large, multi-dimensional datasets, considerable computing power, sensitive detectors, and large data storage capacities are needed for their analysis. Furthermore, most current methods for discerning "plant pixels" from "non-plant pixels" in a hyperspectral image are performed manually. As such, these methods are slow, tedious and require extensive manpower to complete. Therefore, an improvement in any one of these factors can reduce the high cost, data storage requirements, data transfer time, and manual intervention that are associated with obtaining and processing hyperspectral image data.

SUMMARY

A method is provided for automatically discerning between object and non-object pixels in a hyperspectral image data cube. In particular embodiments, the object of the method is a plant, plant part, plant trait, plant phenotype, plant container, or plant medium. The method comprises a first step of providing a partial least squares discriminant analysis (PLSDA) algorithm and a second step of using a processor to apply the PLSDA algorithm to a hyperspectral image data cube to automatically determine which pixels contain the spectral properties of the object of interest.

In a one embodiment, the step of providing a PLSDA algorithm comprises establishing a training matrix, performing an eigenvector decomposition of the training matrix, experimentally determining a weighted linear combination of object signal-containing eigenvectors, calculating a regression vector using the weighted linear combination of signal-containing eigenvectors, generating a mask matrix, and multiplying the mask matrix by the hyperspectral image data cube along two spatial dimensions.

The following embodiments are encompassed by the present invention:

1. A method for automatically discerning between object and non-object pixels in a hyperspectral image data cube, said method comprising:
   (a) providing a partial least squares discriminant analysis algorithm; and
   (b) using a processor to apply said partial least squares discriminant analysis algorithm to a hyperspectral image data cube to automatically determine which pixels contain the spectral properties of the object.
2. The method of embodiment 1, wherein the step of providing a partial least squares discriminant analysis comprises:
   (a) establishing a training matrix;
   (b) performing an eigenvector decomposition of said training matrix;
   (c) experimentally determining a weighted linear combination of object signal-containing eigenvectors;
   (d) calculating a regression vector using said weighted linear combination of signal-containing eigenvectors;
   (e) generating a mask matrix; and,
   (f) multiplying said mask matrix by the hyperspectral image data cube along two spatial dimensions.
3. The method of embodiment 2, wherein said training matrix is created using object spectra and non-object spectra.
4. The method of embodiment 3, wherein the signal of said object spectra and said non-object spectra is separated from the noise of said object spectra and said non-object spectra.
5. The method of embodiment 3 or embodiment 4, wherein said training matrix is developed by manually extracting said spectra from hyperspectral image data cubes containing object spectra and non-object spectra, wherein said manually extracted object spectra are assigned a class value of "1" and said manually extracted non-object spectra are assigned a class value of "0".
6. The method of any one of embodiments 2-5, wherein said mask matrix is developed by calculating a dot product of said regression vector and spectra from each individual pixel present in said hyperspectral image data cube.
7. The method of any one of the previous embodiments, wherein said object is a plant, plant part, plant trait, plant phenotype, plant container, or a plant medium.
8. The method of embodiment 7, wherein said plant or plant part is from a monocot or a dicot.
9. The method of embodiment 8, wherein said monocot or dicot is maize, wheat, barley, sorghum, rye, rice, millet, soybean, alfalfa, *Brassica*, cotton, sunflower, potato, sugarcane, tobacco, *Arabidopsis* or tomato.

DETAILED DESCRIPTION

Figure 1:
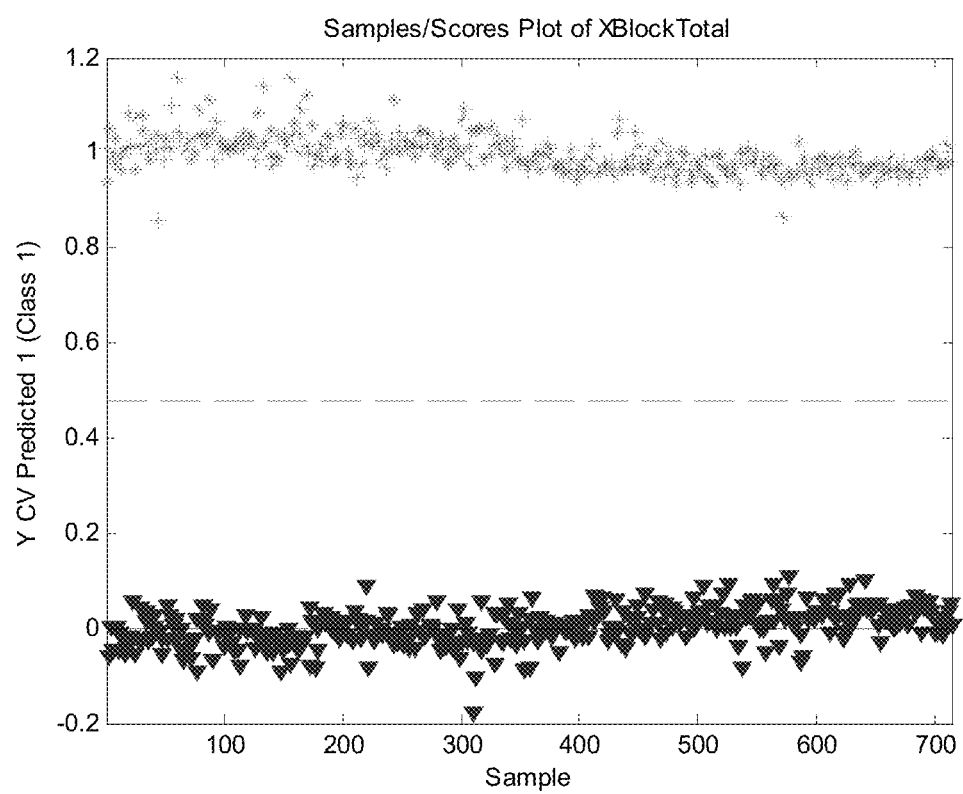
FIG. 1 sets forth a scores plot showing the assignment of class variables (one or zero) for an independent validation set obtained from a hyperspectral plant image, wherein a "one" was assigned to a pixel that was pure plant spectra and a "zero" was assigned to any pixel that was not.

The present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Many modifications and other embodiments of the invention set forth herein will come to mind to one skilled in the art to which this invention pertains having the benefit of the teachings presented in the foregoing descriptions and the associated drawings. Although specific terms are employed herein, they are used in a generic and descriptive sense only and not for purposes of limitation.

As used herein, "hyperspectral" means the simultaneous detection of multiple spectra over a range of wavelengths. In the present invention, the number of wavelengths detected by hyperspectral imaging can vary between about 10 and 10,000 wavelengths, between about 10 and 40 wavelengths and between about 10 and 20 wavelengths. In some examples, the wavelengths detected by the method can range from about 350 nm to 2400 nm or from about 400 nm to 800 nm.

Obtaining a hyperspectral image data cube can be accomplished by any means known in the art. By way of example, hyperspectral sensors can collect information on an object across a range of wavelengths as a set of images. Thus, each image, as well as each pixel of each image, represents a range of the electromagnetic spectrum (i.e., a spectral band). The images can then be combined to form a three-dimensional hyperspectral image data cube that can be analyzed by the methods. Hyperspectral image data cubes can be obtained from objects in a controlled environment (e.g., a greenhouse) or in a natural environment (e.g., a field). The process of collecting hyperspectral images in a controlled environment can be optimized in any number of ways to optimize data collection including, but not limited to, modulating illumination, modulating specular reflection, changing the angle of illumination, and changing the spacing between samples.

Hyperspectral image analysis can be utilized to screen plant varieties for the presence of altered traits and phenotypes. However, many drawbacks contribute to the high cost and slow processing of hyperspectral image data cubes. These include the need for considerable computing power and data storage, the use of highly sensitive detectors, and the manual identification of "plant pixels" and "non-plant pixels" in hyperspectral images.

Accordingly, methods for automatically discerning between "object pixels" and "non-object pixels" in a hyperspectral image data cube are provided. The methods find use in the analysis of any object whose image is captured for hyperspectral analysis. In particular examples, the object of the method is a plant or plant part. The methods also find use in discerning a plant trait or a plant phenotype in a hyperspectral image. Furthermore, in some examples the methods can be used to distinguish any other feature in a hyperspectral image, such as a plant container, or plant medium.

The method advantageously "masks" those pixels that are not associated with the object of interest, thus reducing the number of pixels in a hyperspectral image data cube that require analysis. As such, the method reduces the considerable computing time and resources that are required for hyperspectral image analysis. Furthermore, the statistical analyses utilized by the method allow for the qualitative comparison of pixels in a hyperspectral image data cube to one another. By comparison, conventional techniques for characterizing hyperspectral image data cubes do not relate the spectral properties of each pixel in the image to one another.

Methods for automatically discerning between object and non-object pixels in a hyperspectral image data cube are provided. In one example the method comprises a first step of providing a partial least squares discriminant analysis (PLSDA) algorithm and a second step of using a processor to apply the PLSDA algorithm to a hyperspectral image data cube to automatically determine which pixels contain the spectral properties of the object.

As used herein, the term "discerning" means to distinguish between the spectral properties of an object pixel and the spectral properties of a non-object pixel in a hyperspectral image data cube. "Spectral properties" means the electromagnetic properties that are captured in each pixel of a hyperspectral image data cube. Such spectral properties can be used by the methods to classify a pixel in relation to other pixels in the image. As used herein, a "pixel" refers to the smallest unit of any image that can be represented or controlled. A pixel has its own address that corresponds to its coordinates in an image.

By "partial least squares discriminant analysis" or "PLSDA" is meant the use of statistical analyses that discriminate between two or more naturally occurring groups in a data set. Methods for applying a PLSDA algorithm to a data set are known in the art. A PLSDA algorithm is used in the methods to assign each pixel of a hyperspectral image data cube as being related to the object of the method or not related to the object, based on the spectral properties of each pixel. In a one example, the step of providing a PLSDA algorithm comprises establishing a training matrix, performing an eigenvector decomposition of the training matrix, experimentally determining a weighted linear combination of object signal-containing eigenvectors, calculating a regression vector using the weighted linear combination of signal-containing eigenvectors, generating a mask matrix and multiplying the mask matrix by the hyperspectral image data cube along two spatial dimensions.

In one example, a training matrix is developed by manually extracting the spectra from a hyperspectral image data cube containing both object spectra and non-object spectra. In such an example, the manually extracted object spectra are assigned a class value of "1" and the manually extracted non-object spectra are assigned a class value of "0". In another example, the extraction of spectra from a hyperspectral image data cube can be performed automatically by any method known in the art.

As used herein, "decomposition" of the training matrix means the use of any mathematical method that renders a matrix of the method into a set of eigenvectors. Methods for decomposing matrices are well known in the art and include singular value decomposition, eigendecomposition, Jordan decomposition and Schur decomposition.

In some instances, the signal of the object spectra and the non-object spectra can be separated from the noise of the object spectra and the non-object spectra. As used herein, "noise" means any spectral variation not associated with the spectral signal. Alternatively, "noise" means any variation not assignable to a class, where the classes are object and non-object.

As used herein, a "weighted linear combination" means the sum of a set of ordered basis vectors (i.e., eigenvectors), where each vector is weighted (e.g., multiplied) by some real number. Methods for determining a weighted linear combination are known in the art. Methods for calculating a regression vector using the weighted linear combination of signal-containing eigenvectors are also known in the art.

The "mask matrix" of the method represents the location of all object pixels and non-object pixels in a hyperspectral image data cube. The mask matrix can be developed by calculating a dot product of the regression vector and the spectra for each individual pixel present in the hyperspectral image data cube. The mask matrix can then be multiplied by the hyperspectral image data cube along two spatial dimensions in order to distinguish all object pixels in the image from all non-object pixels. As used herein, a "dot product" means an algebraic operation that takes two equal-length sequences of numbers (i.e., vectors) and returns a single number obtained by multiplying corresponding entries and then summing those products. Methods for calculating a dot product from the regression vectors and spectra of the method are known in the art.

As used herein, a "processor" provides a means to apply the PLSDA algorithm to a hyperspectral image data cube of the method in order to determine which pixels of the image contain the spectral properties of an object. The processor of the method can also provide an output of the method to a user, such that the output comprises the result of applying the PLSDA algorithm to a hyperspectral image data cube of the method.

The processor of the method may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor may be configured to execute instructions stored in a memory device or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or network device) adapted for employing an embodiment of the present invention by further configuration of the processor by instructions for performing the algorithms and/or operations described herein. The processor may include, among other things, a clock, an arithmetic logic unit (ALU) and logic gates configured to support operation of the processor.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

Methods are provided for discerning between object and non-object pixels in a hyperspectral image data cube. As used herein, the terms "object" and "non-object" can refer to any object or organism whose hyperspectral image is captured for analysis.

In a specific example, the object can be a plant or a plant part. Where the object of the method is a plant, the term "plant" includes plant cells, plant protoplasts, plant cell tissue cultures from which plants can be regenerated, plant calli, plant clumps, and plant cells that are intact in plants or parts of plants such as embryos, pollen, ovules, seeds, leaves, flowers, branches, fruit, kernels, ears, cobs, husks, stalks, stems, roots, root tips, anthers, and the like. The method of the invention can be adjusted for the age, size and/or stage of growth of the plants used in the method.

Plants that can be utilized include, but are not limited to, monocots and dicots. Examples of plant species of interest include, but are not limited to, corn (*Zea mays*), *Brassica* sp. (e.g., *B. napus, B. rapa, B. juncea*), alfalfa (*Medicago sativa*), rice (*Oryza sativa*), rye (*Secale cereale*), sorghum (*Sorghum* bicolor, *Sorghum vulgare*), millet (e.g., pearl millet (*Pennisetum glaucum*), proso millet (*Panicum miliaceum*), foxtail millet (*Setaria italica*), finger millet (*Eleusine coracana*)), barley (*Hordeum vulgare*), oats (*Avena sativa*), sunflower (*Helianthus annuus*), safflower (*Carthamus tinctorius*), wheat (*Triticum aestivum*), soybean (*Glycine max, Glycine soja*), tobacco (*Nicotiana tabacum, Nicotiana rustica, Nicotiana benthamiana*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Coffea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentals*), macadamia (*Macadamia integrifolia*), almond (*Prunus amygdalus*), sugar beets (*Beta vulgaris*), sugarcane (*Saccharum* spp.), vegetables, ornamentals, and conifers.

Vegetables of interest include tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), and members of the genus *Cucumis* such as cucumber (*C. sativus*), cantaloupe (*C. cantalupensis*), and musk melon (*C. melo*). Ornamentals include azalea (*Rhododendron* spp.), hydrangea (*Macrophylla hydrangea*), hibiscus (*Hibiscus rosasanensis*), roses (*Rosa* spp.), tulips (*Tulipa* spp.), daffodils (*Narcissus* spp.), petunias (*Petunia hybrida*), carnation (*Dianthus caryophyllus*), poinsettia (*Euphorbia pulcherrima*), and chrysanthemum.

Conifers of interest include, for example, pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*). Hardwood trees can also be employed including ash, aspen, beech, basswood, birch, black cherry, black walnut, buckeye, American chestnut, cottonwood, dogwood, elm, hackberry, hickory, holly, locust, magnolia, maple, oak, poplar, red alder, redbud, royal paulownia, sassafras, sweetgum, sycamore, tupelo, willow, yellow-poplar.

In specific examples, plants of interest are crop plants (for example, corn, alfalfa, sunflower, *Brassica*, soybean, cotton, safflower, peanut, sorghum, wheat, millet, tobacco, etc.). In some examples, corn and soybean and sugarcane plants are of interest. Other plants of interest include grain plants that provide seeds of interest, oil-seed plants, and leguminous plants. Seeds of interest include grain seeds, such as corn, wheat, barley, rice, sorghum, rye, etc. Oil-seed plants include cotton, soybean, safflower, sunflower, *Brassica*, maize, alfalfa, palm, coconut, etc. Leguminous plants include beans and peas. Beans include guar, locust bean, fenugreek, soybean, garden beans, cowpea, mungbean, lima bean, fava bean, lentils, chickpea, etc.

Other plants of interest including Turfgrasses such as, for example, turfgrasses from the genus *Poa, Agrostis, Festuca, Lolium*, and *Zoysia*. Additional turfgrasses can come from the subfamily Panicoideae. Turfgrasses can further include, but are not limited to, Blue gramma (*Bouteloua gracilis* (H.B.K.) Lag. Ex Griffiths); Buffalograss (*Buchloe dactyloids* (Nutt.) Engelm.); Slender creeping red fescue (*Festuca rubra* ssp. *Litoralis*); Red fescue (*Festuca rubra*); Colonial bentgrass (*Agrostis tenuis* Sibth.); Creeping bentgrass (*Agrostis palustris* Huds.); Fairway wheatgrass (*Agropyron cristatum* (L.) Gaertn.); Hard fescue (*Festuca longifolia* Thuill.); Kentucky bluegrass (*Poa pratensis* L.); Perennial ryegrass (*Lolium perenne* L.); Rough bluegrass (*Poa trivialis* L.); Sideoats grama (*Bouteloua curtipendula* Michx. Torr.); Smooth bromegrass (*Bromus inermis* Leyss.); Tall fescue (*Festuca arundinacea* Schreb.); Annual bluegrass (*Poa annua* L.); Annual ryegrass (*Lolium multiflorum* Lam.); Redtop (*Agrostis alba* L.); Japanese lawn grass (*Zoysia japonica*); bermudagrass (*Cynodon dactylon; Cynodon* spp. L. C. Rich; *Cynodon transvaalensis*); Seashore paspalum (*Paspalum vaginatum* Swartz); Zoysiagrass (*Zoysia* spp. Willd; *Zoysia japonica* and *Z. matrella* var. *matrella*); Bahiagrass (*Paspalum notatum* Flugge); Carpetgrass (*Axonopus affinis* Chase); Centipedegrass (*Eremochloa ophiuroides* Munro Hack.); Kikuyugrass (*Pennisetum clandesinum* Hochst Ex Chiov); Browntop bent (*Agrostis tenuis* also known as *A. capillaris*); Velvet bent (*Agrostis canina*); Perennial ryegrass (*Lolium perenne*); and, St. Augustinegrass (*Stenotaphrum secundatum* Walt. Kuntze). Additional grasses of interest include switchgrass (*Panicum virgatum*).

In another example, the object of the method can be a plant trait or plant phenotype. As used herein, a "plant trait" refers to the measurable characteristics of an organism that contribute to a particular phenotype. A "plant phenotype" refers to a measurable characteristic of the plant. In some examples, a plant phenotype is related to at least one biological function. In this manner, all pixels in a hyperspectral image data cube that relate to a particular plant trait or to a particular plant phenotype can be discerned from those pixels that are unrelated to the trait or phenotype.

Plant traits that can be analyzed include, but are not limited to, gas exchange parameters, days to silk (GDUSLK), days to pollen shed (GDUSHD), germination rate, relative maturity, lodging, ear height, flowering time, stress emergence rate, leaf senescence rate, canopy photosynthesis rate, silk emergence rate, anthesis to silking interval, percent recurrent parent, leaf angle, canopy width, leaf width, ear fill, scattergrain, root mass, stalk strength, seed moisture, seedling vigor, greensnap, shattering, visual pigment accumulation, kernels per ear, ears per plant, kernel size, kernel density, seed size, seed color, leaf blade length, leaf color, leaf rolling, leaf lesions, leaf temperature, leaf number, leaf area, leaf extension rate, midrib color, stalk diameter, leaf discolorations, number of internodes, internode length, kernel density, leaf nitrogen content, leaf shape, leaf serration, leaf petiole angle, plant growth habit, hypocotyl length, hypocotyl color, pubescence color, pod color, pods per plant, seeds per pod, flower color, silk color, cob color, plant height, chlorosis, albino, plant color, anthocyanin production, altered tassels, ears or roots, chlorophyll content, stay green, stalk lodging, brace roots, tillers, barrenness/prolificacy, glume length, glume width, glume color, glume shoulder, glume angle, head density, head color, head shape, head angle, head size, head length, panicle length, panicle width, panicle size, panicle shape, panicle color, panicle type, panicle branching, panicles per plant, culm angle, culm length, ligule color, ligule shape, spike shape, grain nitrogen content and plant or grain chemical composition (i.e., moisture, protein, oil, starch or fatty acid content, fatty acid composition, carbohydrate, sugar or amino acid content, amino acid composition and the like).

Plant phenotypes include, but are not limited to, plant architecture, plant morphology, plant health, leaf texture phenotype, plant growth, total plant area, biomass, standability, dry shoot weight, yield, yield drag, physical grain quality, nitrogen utilization efficiency, water use efficiency, pest resistance, disease resistance, transgene effects, response to chemical treatment, abiotic stress tolerance, biotic stress tolerance, energy conversion efficiency, photosynthetic capacity, harvest index, source/sink partitioning, carbon/nitrogen partitioning, cold tolerance, freezing tolerance and heat tolerance.

In yet another example, the object of the method can be a plant container, plant medium, or any other object that is associated with the growth or maintenance of a plant in a controlled environment or in a field. As used herein, a "plant medium" means any substance or composition which supports the growth of the plant. Such media include, but are not limited to, soil, turf, agar, hydroponic solutions, and artificial media. Discernment of such objects is useful for reducing or removing reflective noise from a hyperspectral image data cube. In a further example, the object of the method can be a lesion on a plant, or the location of a treatment of a plant.

The article "a" and "an" are used herein to refer to one or more than one (i.e., to at least one) of the grammatical object of the article. By way of example, "an element" means one or more element.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

EXAMPLES

Example 1

Automatic Edge Detection of Plant Pixels During Hyperspectral Analysis

A partial least squares discriminant analysis (PLSDA) algorithm was developed to provide automatic class analysis of each pixel in an image to determine if the pixel contains a spectrum of plant material or not. The output of this algorithm was a matrix of ones and zeros, with a "1" being assigned to a pixel that is pure plant spectra and a "0" for any pixel that was not. This matrix is referred to as a "mask" matrix (i.e., pixels that are not of interest are "masked" out). The scores plot illustrated in FIG. 1 shows the assignment of the class variables (one or zero) for an independent validation set. The light grey stars are pixels that contained plant spectra and the dark grey triangles are pixels that did not contain plant spectra. It is clear from the scores plot in FIG. 1 that complete discrimination between plant and non-plant pixels was achieved.

Figure 2:
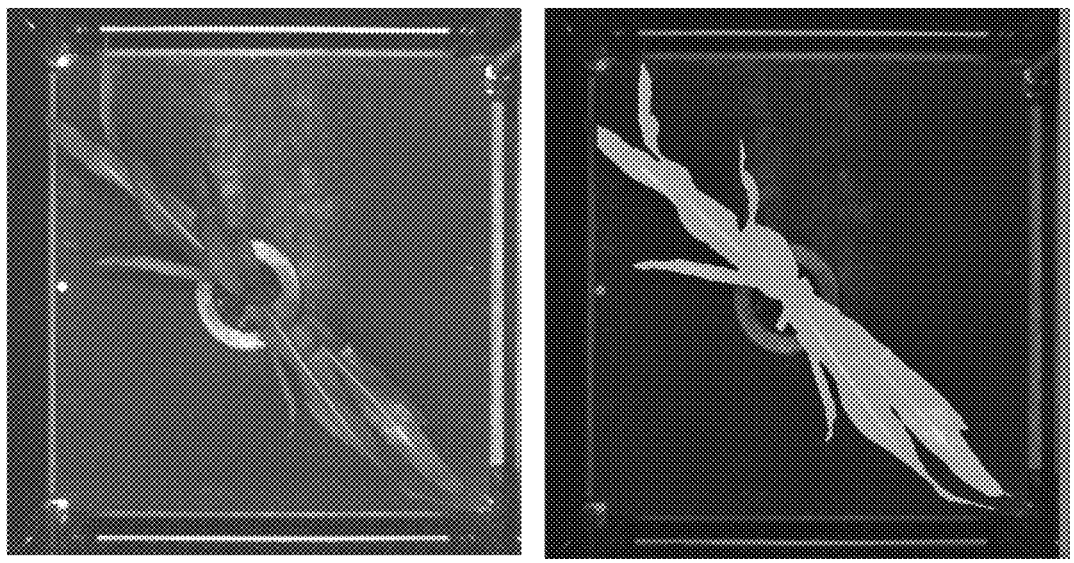
FIG. 2 sets forth a hyperspectral plant image (left panel) wherein all of the "plant pixels" were marked light grey (right panel) as a result of applying the mask matrix produced by the method. None of the "non-plant pixels" in the image were marked as containing plant spectra.

FIG. 2 provides an example of the effectiveness of this algorithm. When the calculated "mask" matrix was applied to a hyperspectral image of a corn plant (left panel), it marked a "plant pixel" as light grey and did not alter any "non-plant pixel" (right panel). It is clear that all of the "plant pixels" were marked in the right panel and none of the other pixels were marked as containing plant spectra. This process has also been successfully performed with other plants including soybeans. The outcome of this new algorithm is twofold. First, this algorithm eliminated the need for manual spectral selection, thus reducing the manpower needed to process the data. Second, each image captured for these studies can contain ~250,000,000 data points, of which only ~10% contains plant spectral information. By applying the mask matrix early in a process, 90% of the data can be discarded as containing no useful information, thus reducing computing time by 90%. Furthermore, application of the mask matrix early in the process can reduce both data storage space and data transfer time, thus minimizing the potential for data file corruption, lost data, and the need to recollect data.

Example 2

Automatic Research Plot Detection

A PLSDA model was developed to identify the plant pixels in an image collected from a hyperspectral imager. Spectra from plant and soil pixels were manually selected for development of the PLSDA model identify plant material in the hyperspectral scene. The images were collected from a two-row research plot designed field in Woodland, Calif. containing a single maize variety. The plant canopy had filled in at the time of collection. Raw reflectance spectra without correction were used in the calibration. The image pixel size collected 8 cm of spatial data across the research plot rows and 30 cm along the rows. The hyperspectral images were collected with a line scanning imager. Images were taken along the rows so that spatial resolution across the rows was determined by the optics and along the rows by optics combined with the speed of the imager. Images were geospatial registered to correct for any motion of the imager. The correction improved manual identification of the soil and plant pixels.

Figure 3:
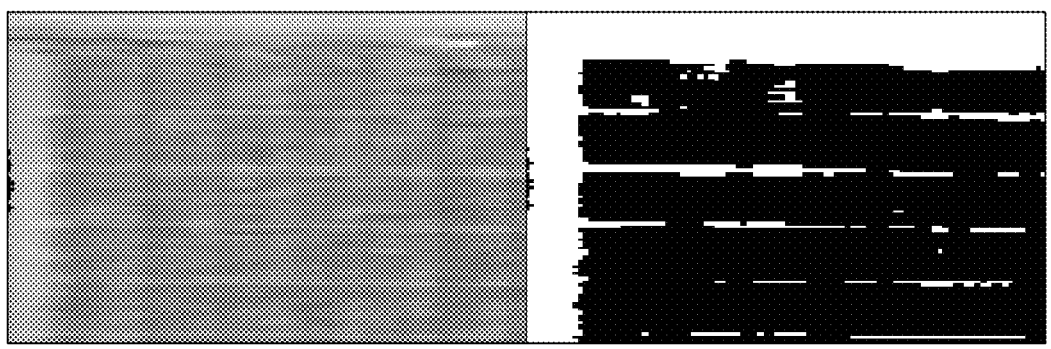
FIG. 3 sets forth plant and soil pixels that were manually selected for development of a PLSDA model to identify plant material in the hyperspectral scene. The images were collected from a two row research plot of one corn variety using a line scanning imager. Light grey pixels in the left panel represent soil while the dark grey pixels represent reflectance from the research plot plants. The right panel depicts the image after the application of the mask matrix, wherein the dark pixels represent plant pixels.

After the mask was calculated with the PLSDA model, it was applied to the image in the left panel of FIG. 3. The left panel is a raw grayscale image derived from the hyperspectral imager after geospatial correction. The lighter grey pixels were from soil while the darker pixels are the reflectance back from the research plot. Research plot range and row structure are evident in the image. Soil pixels were assigned to white and plant assigned to black in the right image of FIG. 3. The edge of the research plot is very well identified by this mask along with some of the alley ways that had not yet been covered by the canopy.

Example 3

Automatic Detection of Specific Plant Characteristic

Figure 4:
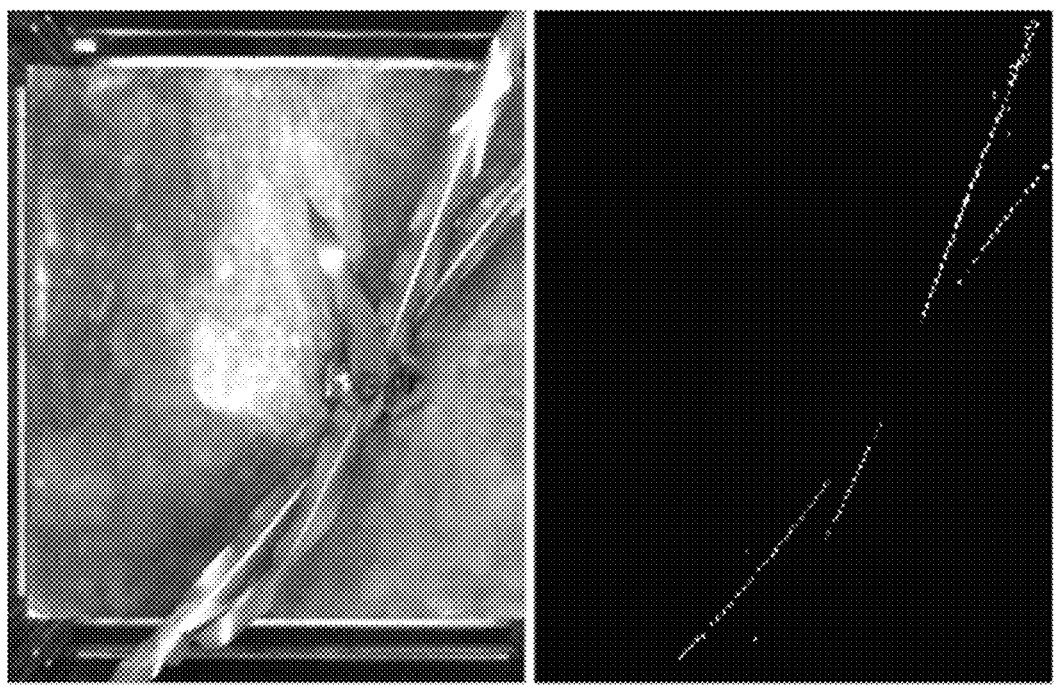
FIG. 4 sets forth a hyperspectral image (left panel) wherein the object pixels are defined to specifically detect the midrib as a result of applying the mask matrix produced by the method (right panel). None of the "non-midrib pixels" in the image were marked as containing midrib spectra.

The methods can also be used to selectively identify specific characteristics of a plant, including but not limited to, for example, a specific tissue, architecture, and/or phenotype. A PLSDA model was built in order to select the midrib of a maize leaf (the object) from the leaf (non-object). The PLSDA model was built by assigning the spectra manually extracted from the hyperspectral images in the leaf and in the midrib and assigning them to the respective class 0 and 1. The model was built and applied to the image shown in the left panel of FIG. 4. The mask was then applied to the original image resulting in the object image in the right pane of FIG. 4 where the mid-rib is the only portion of the image that is observed. Other methods using red edge detection were more sensitive to the pixels that resulted from the specular reflection and were not from the midrib than the PLSDA derived mask.

That which is claimed:

1. A method for automatically discerning between object and non-object pixels in a hyperspectral image data cube, said method comprising:
   (a) providing a partial least squares discriminant analysis algorithm, comprising,
      (i) establishing a training matrix,
      (ii) performing an eigenvector decomposition of said training matrix,
      (iii) experimentally determining a weighted linear combination of object signal-containing eigenvectors,
      (iv) calculating a regression vector using said weighted linear combination of signal-containing eigenvectors,
      (v) generating a mask matrix, and
      (vi) multiplying said mask matrix by the hyperspectral image data cube along two spatial dimensions; and
   (b) using a processor to apply said partial least squares discriminant analysis algorithm to a hyperspectral image data cube to automatically determine which pixels contain the spectral properties of the object.

2. The method of claim 1, wherein said training matrix is created using object spectra and non-object spectra.

3. The method of claim 2, wherein a signal associated with said hyperspectral image data cube is separated into portions representing said object spectra, said non-object spectra, and noise.

4. The method of claim 2, wherein said training matrix is developed by manually extracting said spectra from hyperspectral image data cubes containing object spectra and non-object spectra, wherein said manually extracted object spectra are assigned a class value of "1" and said manually extracted non-object spectra are assigned a class value of "0".

5. The method of claim 1, wherein said mask matrix is developed by calculating a dot product of said regression vector and spectra from each individual pixel present in said hyperspectral image data cube.

6. The method of claim 1, wherein said object is a plant, plant part, plant trait, plant phenotype, plant container, or a plant medium.

7. The method of claim 6, wherein said plant or plant part is from a monocot or a dicot.

8. The method of claim 7, wherein said monocot or dicot is maize, wheat, barley, sorghum, rye, rice, millet, soybean, alfalfa, *Brassica*, cotton, sunflower, potato, sugarcane, tobacco, *Arabidopsis* or tomato.

9. A method for automatically discerning between plant and non-plant pixels in a hyperspectral image data cube, said method comprising:
   (a) providing a partial least squares discriminant analysis (PLSDA) algorithm, wherein said PLSDA algorithm is provided by,
      (i) establishing a training matrix using plant spectra and non-plant spectra, wherein signal of said plant spectra and said non-plant spectra is separated from noise of said plant spectra and said non-plant spectra, and wherein said training matrix is developed by extracting said spectra from hyperspectral image data cubes containing plant spectra and non-plant spectra, wherein said extracted plant spectra are assigned a class value of "1" and said extracted non-plant spectra are assigned a class value of "0",
      (ii) performing an eigenvector decomposition of said training matrix,
      (iii) experimentally determining a weighted linear combination of object signal-containing eigenvectors,
      (iv) calculating a regression vector using said weighted linear combination of signal-containing eigenvectors,
      (v) generating a mask matrix by calculating a dot product of said regression vector and spectra from each individual pixel present in said hyperspectral image data cube, and
      (vi) multiplying said mask matrix by the hyperspectral image data cube along two spatial dimensions; and
   (b) using a processor to apply said partial least squares discriminant analysis algorithm to a hyperspectral image data cube to automatically determine which pixels contain the spectral properties of the object.

10. The method of claim 9, wherein said training matrix is created using object spectra and non-object spectra.

11. The method of claim 9, wherein said object is a plant, plant part, plant trait, plant phenotype, plant container, or a plant medium.

12. The method of claim 11, wherein said plant or plant part is from a monocot or a dicot.

13. The method of claim 12, wherein said monocot or dicot is maize, wheat, barley, sorghum, rye, rice, millet, soybean, alfalfa, *Brassica*, cotton, sunflower, potato, sugarcane, tobacco, *Arabidopsis* or tomato.

14. A system comprising a processor configured to:
   (a) provide a partial least squares discriminant analysis algorithm, comprising,
      (i) establishing a training matrix,
      (ii) performing an eigenvector decomposition of said training matrix,
      (iii) experimentally determining a weighted linear combination of object signal-containing eigenvectors,
      (iv) calculating a regression vector using said weighted linear combination of signal-containing eigenvectors,
      (v) generating a mask matrix, and
      (vi) multiplying said mask matrix by the hyperspectral image data cube along two spatial dimensions; and
   (b) apply said partial least squares discriminant analysis algorithm to a hyperspectral image data cube to automatically determine which pixels contain the spectral properties of the object.

15. The system of claim 14, wherein said training matrix is created using object spectra and non-object spectra.

16. The system of claim 15, wherein a signal associated with said hyperspectral image data cube is separated into portions representing said object spectra, said non-object spectra, and noise.

17. The system of claim 15, wherein said training matrix is developed by manually extracting said spectra from hyperspectral image data cubes containing object spectra and non-object spectra, wherein said manually extracted object spectra are assigned a class value of "1" and said manually extracted non-object spectra are assigned a class value of "0".

18. The system of claim 14, wherein said mask matrix is developed by calculating a dot product of said regression vector and spectra from each individual pixel present in said hyperspectral image data cube.

19. The system of claim 14, wherein said object is a plant, plant part, plant trait, plant phenotype, plant container, or a plant medium.

20. The system of claim 19, wherein said plant or plant part is from a monocot or a dicot.

* * * * *